United States Patent

Nanami et al.

[11] Patent Number: 5,853,308
[45] Date of Patent: Dec. 29, 1998

[54] ENGINE AND EXHAUST SYSTEM FOR WATERCRAFT

[75] Inventors: Masayoshi Nanami; Ryoichi Nakase; Tetsuya Mashiko, all of Hamamatsu, Japan

[73] Assignee: Sanshin Kogyo Kabushiki Kaisha, Hamamatsu, Japan

[21] Appl. No.: 723,163

[22] Filed: Sep. 27, 1996

Related U.S. Application Data

[63] Continuation of Ser. No. 318,055, Oct. 4, 1994, abandoned.

[30] Foreign Application Priority Data

| Oct. 4, 1993 | [JP] | Japan | 5-247947 |
| Oct. 19, 1993 | [JP] | Japan | 5-261186 |

[51] Int. Cl.$^6$ .................................................. B63H 21/32
[52] U.S. Cl. ........................ 440/89; 114/270; 123/184.33
[58] Field of Search ........................ 123/184.31–184.37, 123/73 A, 65 R, 73 R, 73 C, 73 SC, 65 DE, 65 A, 65 EM, 52.6, 179.29, 55.6, 54.6, 54.4, 184.41, 65 VA, 72, 65 V; 440/88, 89, 900, 75, 83, 113, 38; 60/310, 320, 321

[56] References Cited

U.S. PATENT DOCUMENTS

| 1,250,950 | 12/1917 | Bolton | 123/72 |
| 1,292,165 | 1/1919 | Vincent | 123/184.32 |
| 1,681,910 | 8/1928 | Slaght | 123/52.6 |
| 2,057,062 | 10/1936 | Schneider | 123/54.4 |
| 2,059,220 | 11/1936 | Fernstrum | 440/111 |
| 2,091,496 | 8/1937 | Treen | 123/73 A |
| 3,280,805 | 10/1966 | Müller | 123/54.6 |
| 4,592,311 | 6/1986 | Makino | 123/73 A |
| 4,592,329 | 6/1986 | Yunick | 123/184.41 |
| 4,634,392 | 1/1987 | Nishida | 114/270 |
| 4,773,883 | 9/1988 | Nakase et al. | 440/89 |
| 4,972,809 | 11/1990 | Hirasawa | 440/89 |
| 4,986,208 | 1/1991 | Kobayashi | 114/270 |
| 4,989,409 | 2/1991 | Nakase et al. | 440/89 |
| 5,136,990 | 8/1992 | Motoyama et al. | 123/73 C |
| 5,172,786 | 12/1992 | Ishibashi et al. | 123/73 A |

FOREIGN PATENT DOCUMENTS

| 991667 | 10/1951 | France | 123/72 |

*Primary Examiner*—Ed L. Swinehart
*Attorney, Agent, or Firm*—Knobbe, Martens, Olson & Bear LLP

[57] ABSTRACT

Two embodiments of two-cycle V-type crankcase compression internal combustion engines for powering a jet propelled watercraft. In each embodiment, the pistons of the cylinder banks each drive their own crankshafts which are geared by a transmission to an output shaft. The exhaust system for the engine is disposed on the outside of the cylinder banks and includes an expansion chamber and a portion of the exhaust system that passes over the engine. The induction system for the engine is positioned in the valley between the cylinder banks.

26 Claims, 9 Drawing Sheets

ENGINE AND EXHAUST SYSTEM FOR WATERCRAFT

This application is a continuation of U.S. patent application Ser. No. 08/318,055, filed Oct. 4, 1994, now abandoned.

BACKGROUND OF THE INVENTION

This invention relates to an engine and more particularly to an improved engine and exhaust system for use in a watercraft and particularly a small personal type of watercraft.

Growing in popularity is a relatively small type of watercraft referred to as a "personal watercraft". This type of watercraft is relatively small and is designed primarily to accommodate a rider and no more than one or two passengers. Frequently these watercraft are quite sporting in nature and the operator and passengers may be seated in a straddle tandem fashion. Often times, jet pumps are utilized as the propulsion device for such watercraft.

As with all watercraft, this type of personal watercraft requires the use of a relatively compact power plant. For that reason, it has been proposed to employ two-cycle crankcase compression, internal combustion engines as the power plant. These engines are quite compact. In addition, since the cylinders of the engine fire each revolution of the crankshaft, they have a relatively large power output for their specific displacement.

As with all engines, however, there are certain spatial considerations that still must be considered. For example, if in-line engines are employed, they tend to have not only considerable length for their displacement, but also may have substantial height. V-type engines, on the other hand, offer some reduction in length but the width of the engine becomes greater. In addition, V-type engines present certain problems in conjunction with the location of the induction and exhaust systems. These problems are particularly acute in conjunction with two-cycle crankcase compression engines employing multiple cylinders.

It is, therefore, a principal object of this invention to provide an improved and compact two-cycle V-type engine that can be utilized as the propulsion device in a small watercraft.

It is a further object of this invention to provide an improved compact two-cycle crankcase compression internal combustion engine wherein the induction and exhaust systems are laid out in such a way as to provide a compact arrangement and yet afford accessibility for components which must be serviced.

It is frequently the practice with V-type engines to mount the cylinder banks in a staggered relationship so that the cylinders of the adjacent banks may have their connecting rods journaled on a common throw of a common crankshaft. However, the staggering of the cylinder banks increases the length of the engine.

It is, therefore, a still further object of this invention to provide an improved and compact type of the two-cycle crankcase compression engine.

As has been noted, the personal watercraft are frequently powered by jet pumps commonly known as jet propulsion units. However, it is also well known that the impeller system of a jet propulsion unit can be subject to cavitation if driven at too high a speed. On the other hand, in order to provide a compact propulsion unit, it is desirable to operate the engine at a high rate of speed. By increasing the speed of the engine it is possible to increase the power of the engine without increasing its size. However, when the engines run at high speed, then the speed of the output shaft of the engine is such that the impeller of the jet propulsion unit may be driven at too high a speed.

It has, therefore, been proposed to provide a transmission between the engine and jet propulsion unit so as to permit the engine to operate at the desired speed without causing cavitation of the impeller. This arrangement, however, adds further to the bulk of the unit and provides problems such as alignment of the various components and so forth.

It is, therefore, a still further object of this invention to provide an improved V-type two-cycle crankcase compression engine for a watercraft that can include a built-in transmission in its construction.

SUMMARY OF THE INVENTION

A first feature of the invention is adapted to be embodied in an inboard, two-cycle, crankcase compression internal combustion engine unit for a watercraft having a crankcase chamber journalling an output shaft. A pair of cylinder blocks extend at a V-angle to each other and are affixed to the crankcase chamber. Each cylinder block contains at least one piston for driving the output shaft. An induction system for the propulsion unit is disposed substantially completely in a valley defined between the cylinder banks. A pair of exhaust manifolds are each affixed to a respective one of the cylinder blocks on a side facing away from the valley.

Another feature of the invention is also adapted to be embodied in an inboard, two-cycle, crankcase compression internal combustion engine unit for a watercraft having a crankcase chamber journalling an output shaft. A pair of cylinder blocks extend at a V-angle to each other and are affixed to the crankcase chamber. Each cylinder block contains at least one piston for driving a respective crankshaft journalled in the crankcase chamber. The crankshafts of the respective cylinder blocks are coupled to each other and to an output shaft by a transmission and the output shaft is adapted to drive a propulsion unit of the watercraft.

DETAILED DESCRIPTION OF THE PREFERRED EMBODIMENTS OF THE INVENTION

Figure 1:
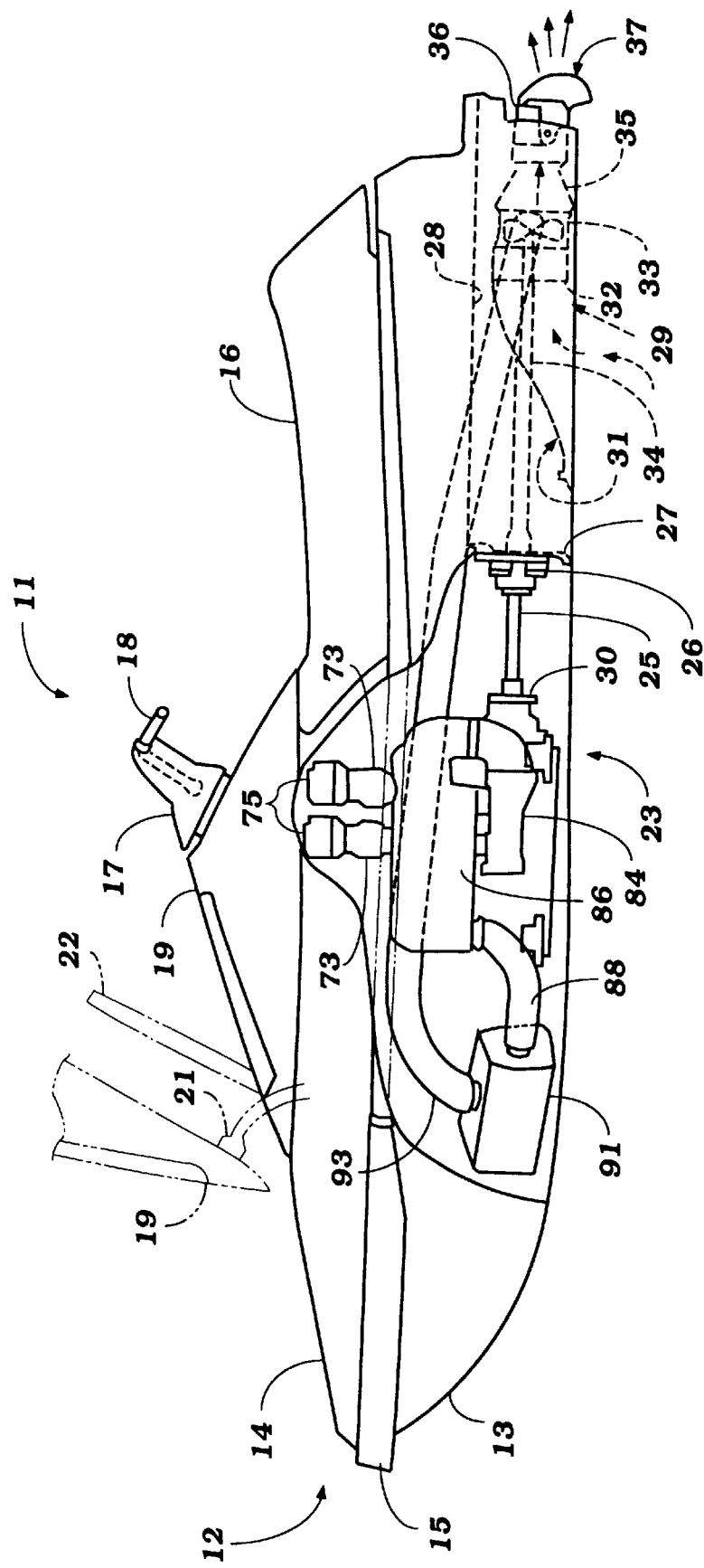
FIG. 1 is a side elevational view of a small watercraft powered by a propulsion unit constructed in accordance with a first embodiment of the invention, with a portion broken away and another portion shown in its normal operating condition in solid lines and in respective service positions in phantom lines.
Figure 2:
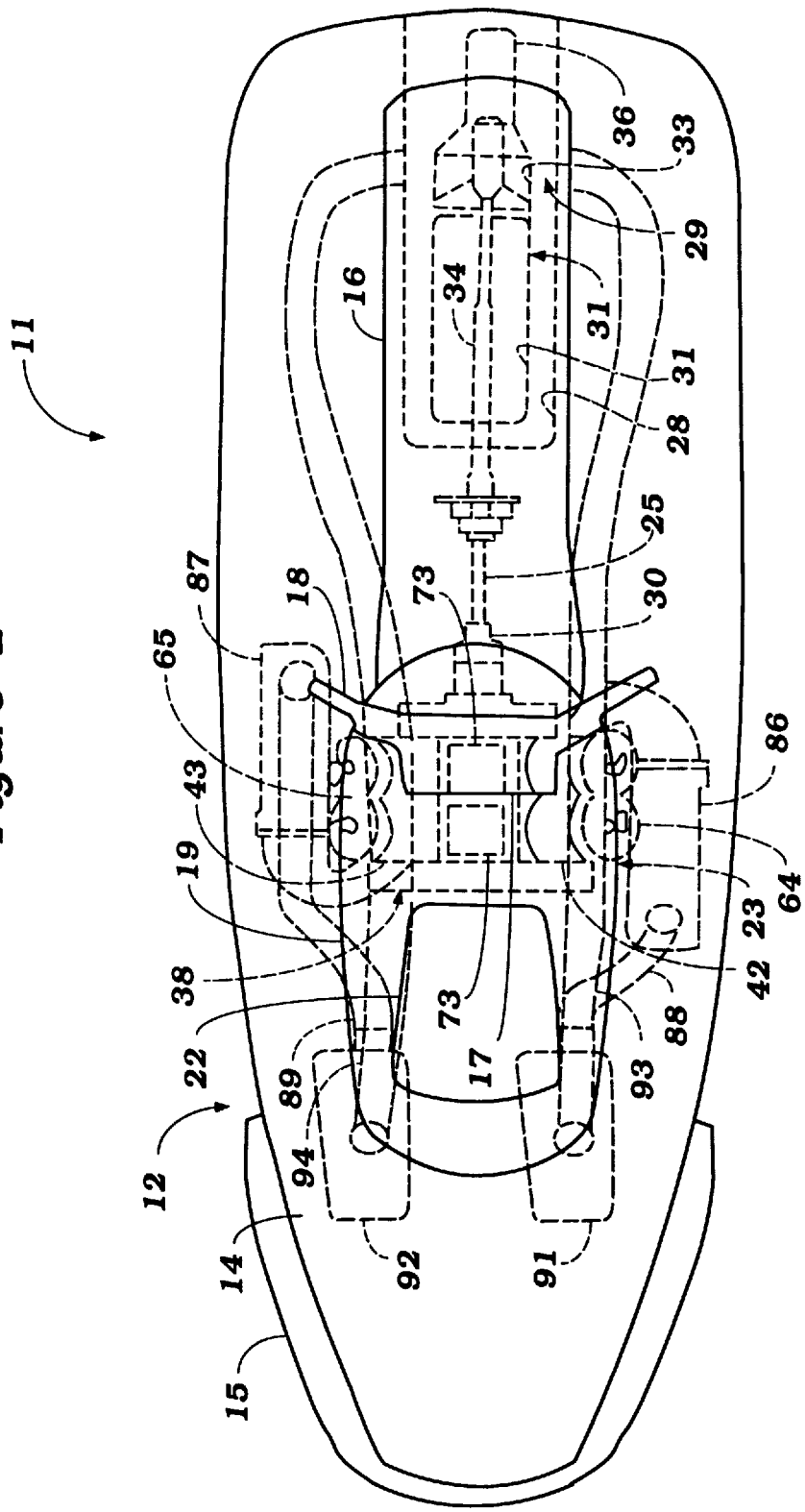
FIG. 2 is a top plane view of the watercraft shown in FIG. 1.

Referring first in detail to the embodiment of FIGS. 1–4 and initially primarily to FIGS. 1 and 2, a small personal watercraft constructed in accordance with this embodiment of the invention is identified generally by the reference numeral 11. It is to be understood that, although the invention is described in conjunction with a personal type of watercraft, certain facets of the invention may be utilized with other types of watercraft. Also, the personal watercraft 11 that is illustrated has a form which is particularly useful with the invention. However, watercraft of other forms may also be employed as will be readily apparent to those skilled in the art. In addition, certain features of the layout of the watercraft 11 are particularly useful in that they afford accessibility of the engine and certain of its components, as will become apparent.

The watercraft 11 is comprised of a hull, indicated generally by the reference numeral 12 which is comprised of an under hull portion 13 and a deck portion 14. The hull portion 13 and deck portion 14 may be formed from any suitable material such as a molded fiberglass reinforced resin or the like. The hull and deck portions 13 and 14 are affixed to each other in any known manner, such as by bonding adhesive or welding. A bumper section 15 is affixed to the forward portion of the hull 12 at the area around the joint between the hull portion 13 and deck portion 14.

The rear portion of the deck 14 accommodates a seat 16 which extends longitudinally of the watercraft in a passenger's area. The seat 16 is designed so as to accommodate an operator and one or two passengers seated in straddle tandem fashion. A pair of depressed foot areas are disposed on opposite sides of the seat 16 so as to accommodate the legs of the riders.

Disposed immediately forwardly of the seat 16 is a control mast 17 mounting a handlebar assembly 18 for steering of the watercraft 11 in a manner which will be described. The mast 17 is mounted on a hatch assembly 19 that covers an engine compartment, as will be described. This hatch assembly 19 is mounted by means of a hinge 21 for pivotal movement between a normal operative condition as shown in solid lines in FIGS. 1 and 2 and an opened or access position as shown in phantom lines in FIG. 1. The control mast 17 and handlebar assembly 18 are mounted on the hatch 19 and pivot with it.

In addition, the hatch 19 is provided with a smaller opening having a further pivotally supported cover 22 that is pivoted at its forward end and so as to afford access to the engine compartment for servicing without needing to pivot the entire hatch assembly 19.

As has been noted, the area beneath the hatch 19 forms an engine compartment and an internal combustion engine, constructed in accordance with an embodiment of the invention and indicated generally by the reference numeral 23 in mounted therein in a suitable manner. An example of such a mounting will be described later by reference to the embodiment of FIGS. 5–9. The construction of the engine 23 will be described later by more reference to FIGS. 3 and 4 but in the illustrated embodiment the engine 23 is a V-4 two-cycle crankcase compression engine. The invention has particular utility with such engines.

The engine 23 has an output shaft 24 that drives a drive shaft 25 through which extends rearwardly and is journaled by a bearing 26 on a bulkhead assembly 27. The bulkhead assembly 27 is formed at the front end of a tunnel 28 that is formed in the under side of the hull portion 13 and beneath the seat 16. A flexible joint 30 is interposed in the connection between the output shaft 24 and the drive shaft 25.

A jet propulsion unit, indicated generally by the reference numeral 29 is mounted within this tunnel 28 in a suitable manner. The jet propulsion unit 29 may be of any known type and is comprised of an outer housing assembly defining a water inlet portion 31 which defines a downwardly facing water inlet opening flush with the bottom surface of the hull portion 13. An impeller housing 32 is formed at the end of the water inlet portion 31 and contains an impeller 33. The impeller 33 is affixed to an impeller shaft 34 which may be either connected to or integrally formed with the drive shaft 25 so as to be driven by the engine 23.

The impeller 33 draws water through the inlet opening portion 31 as shown by the arrows in FIG. 1 and discharges it rearwardly through a discharge nozzle portion 34. The discharge nozzle portion 35 pivotally supports a steering nozzle 36 which is pivotal about a vertically extending steering axis. This steering nozzle 36 is coupled to the handlebar assembly 18 in a known manner, as by means of a bowden wire cable (not shown) for steering of a watercraft 11 in a well known manner.

If desired, a reverse thrust bucket 37 may be mounted at the discharge end of the steering nozzle 36 for movement between a forward drive position and a reverse drive position as shown in FIG. 1, where the water from the discharge nozzle 35 will be redirected in a forward direction so as to affect a reverse thrust on the watercraft 11. The reverse thrust bucket 37 is operated in any known manner.

Except for the hatch assembly 19, the construction as thus far described may be considered to be conventional and, for that reason, further description of the conventional portions of the watercraft 11 is not believed to be necessary. Where any component is not illustrated or described, it may be considered to be of any conventional type of construction.

Figure 3:
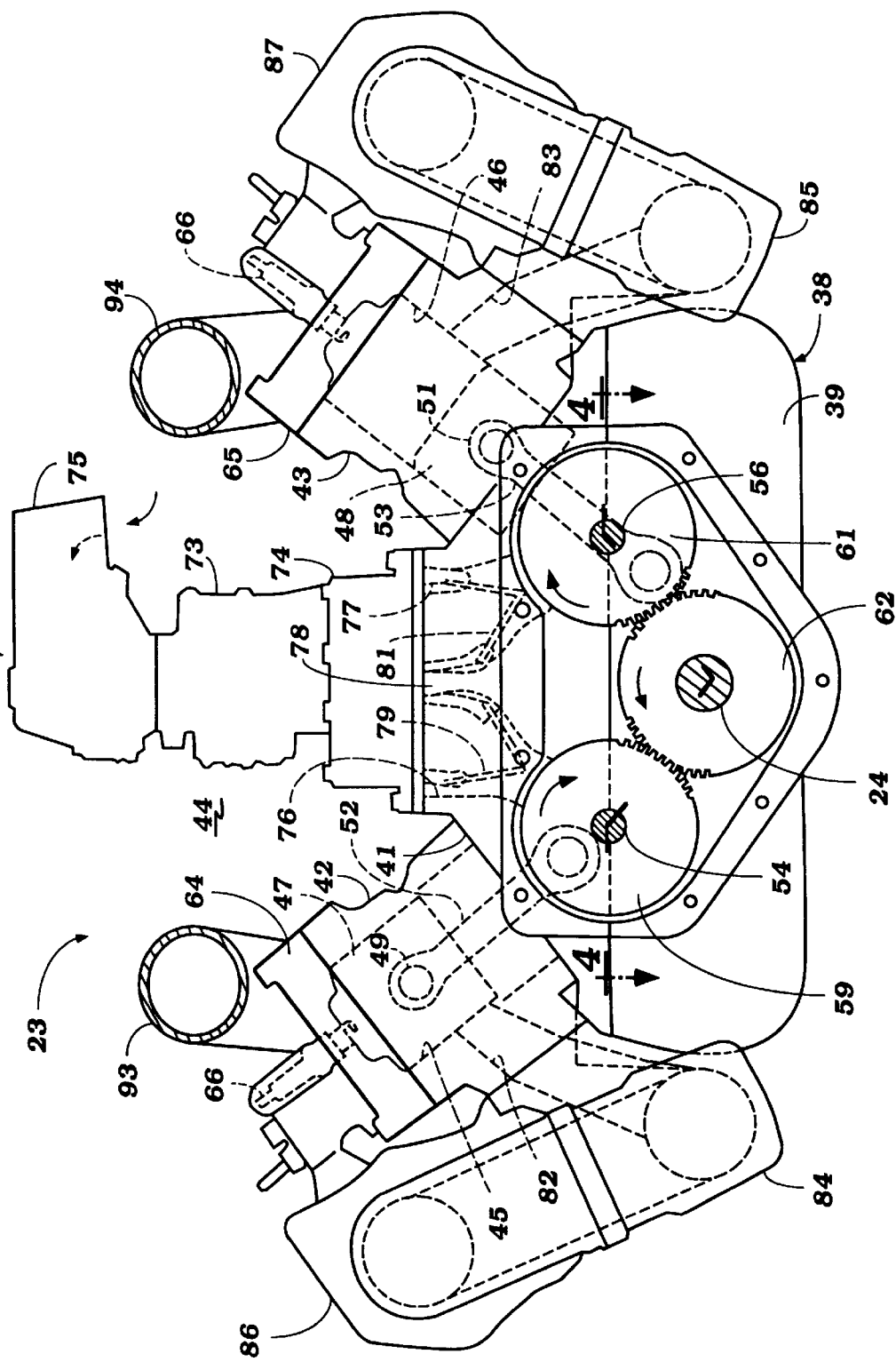
FIG. 3 is an enlarged rear elevational view of the engine of the watercraft, with portions broken away and shown in sections.
Figure 4:
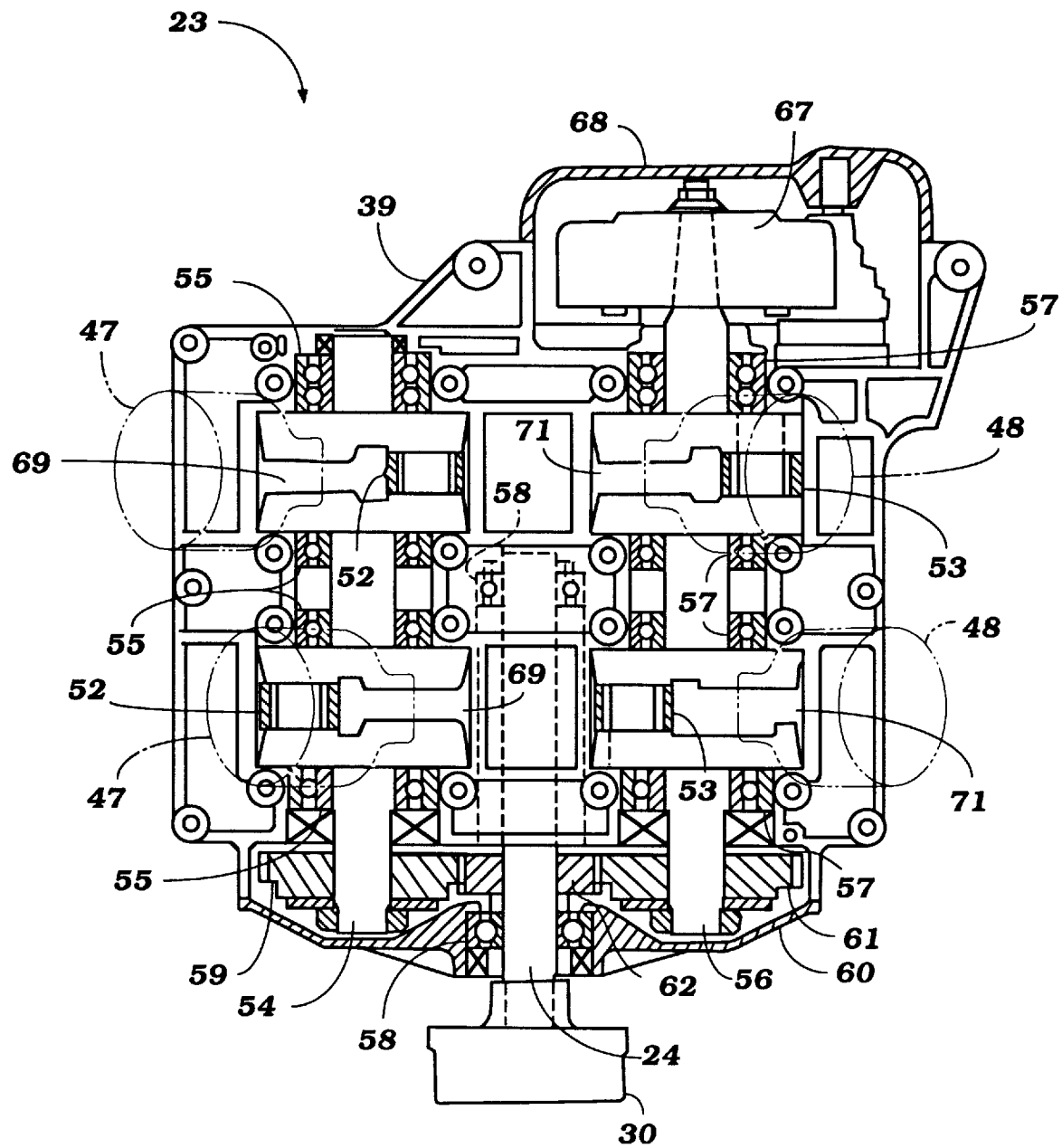
FIG. 4 is a cross-sectional view taken along the line 4—4 of FIG. 3 showing the pistons in phantom.
Figure 5:
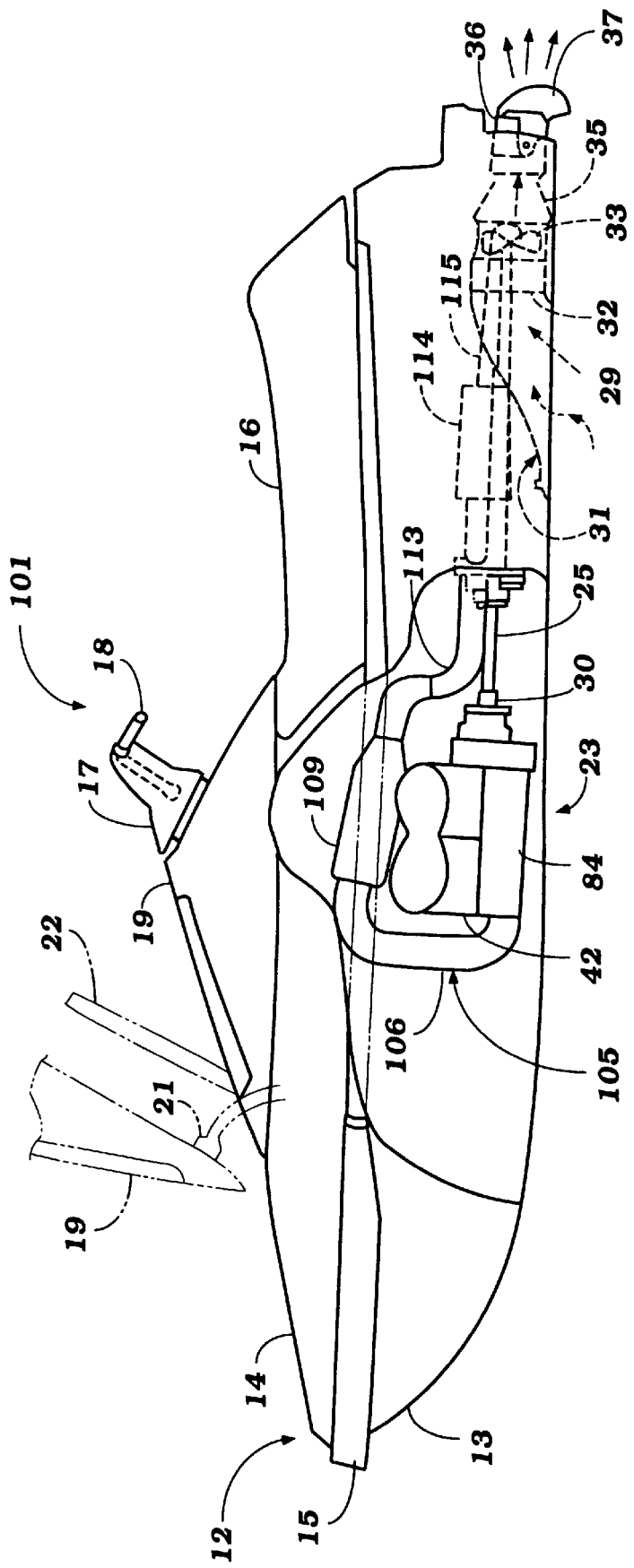
FIG. 5 is a side elevational view, in part similar to FIG. 1, and shows a watercraft constructed in accordance with another embodiment of the invention.
Figure 6:
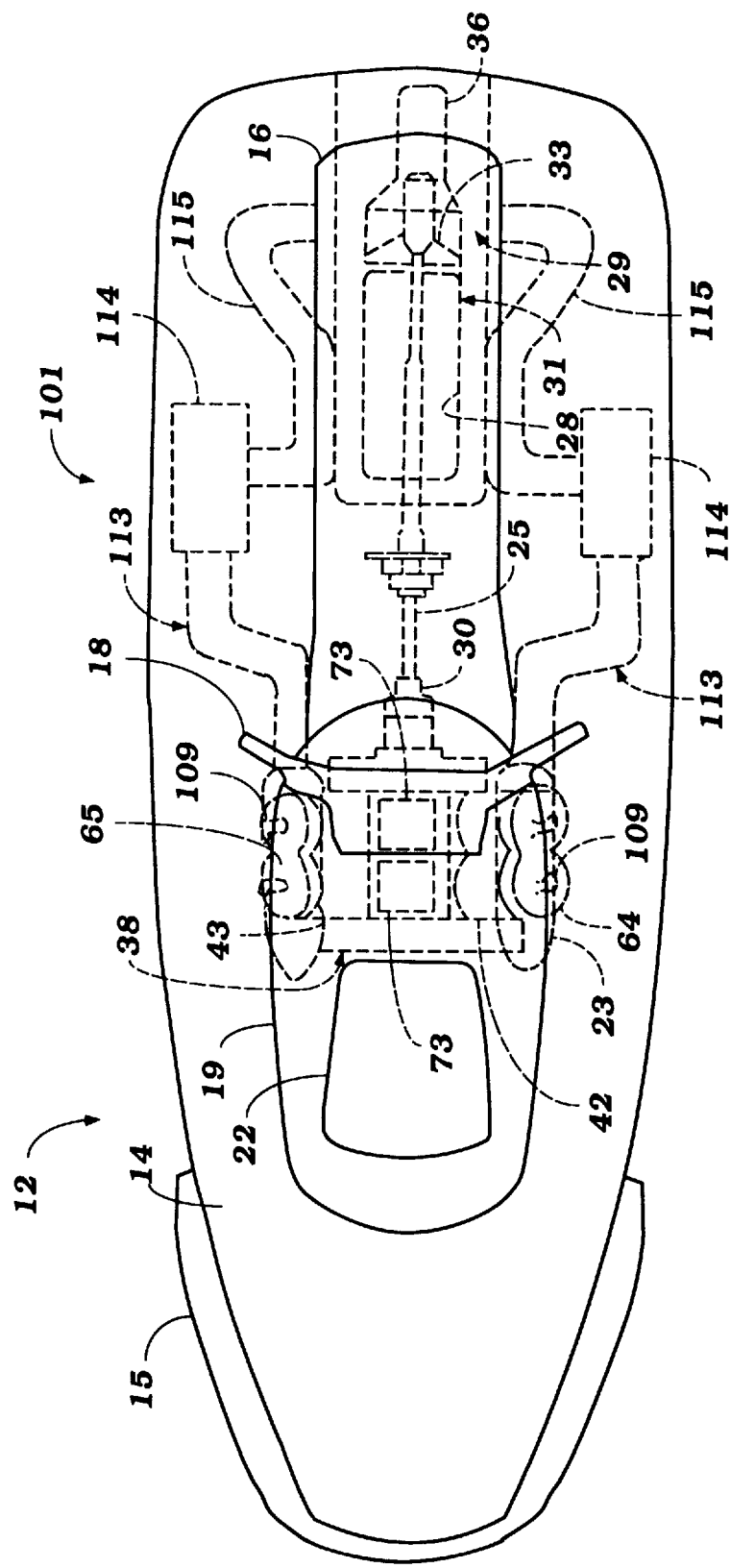
FIG. 6 is a top plane view of this embodiment.

The construction of the engine 23 will now be described by primary reference to FIGS. 3 and 4 although certain of the engine components appear in FIGS. 1 and 2. As has been noted, the engine 23 is of the V-4 type and operates on a two-cycle, crankcase compression principle. The engine 23 is comprised of a crankcase assembly, indicated generally by the reference numeral 38 and which is comprised, in the illustrated embodiment, of a lower portion 39 and an upper portion 41 which are connected to each other in a known manner. The crankcase portions 39 and 41 may be formed from any suitable material such as light weight aluminum or aluminum alloy castings.

A pair of cylinder blocks 42 and 43 are affixed to the opposite sides of the crankcase assembly 38 and are inclined at a V-angle to each other so as to define a valley 44 therebetween. Each cylinder block 42 is formed with a pair of respective cylinder bores 45 and 46. Pistons 47 and 48 are slidably supported in the cylinder bores 45 and 46, respectively, and are connected by means of piston pins 49 and 51 to respective connecting rods 52 and 53. The connecting rods 52 of the left hand cylinder bank 42 are connected at their lower or big ends to the throws of a first crankshaft 54 that is rotatably journaled in the crankcase chamber 38 by means of a plurality of spaced main bearings 55. The main bearings 55 are of the roller type. It should be noted that the crankshaft 54 is offset transversely relative to the output shaft 24 and disposed vertically above it as clearly seen in FIG. 3.

In a similar manner, the connecting rods 53 of the cylinder block 43 are connected at their lower or big ends to a second crankshaft 56 that is rotatably journaled about an axis that lies in the same plane as the axis of the first crankshaft 54 but on the opposite side of the output shaft 24. Roller type main bearings 57 provide the rotational support for the second crankshaft 56 in the crankcase assembly 38. It should be noted that the roller bearings 55 and 57 are axially aligned with each other as are the throws of the crankshafts 54 and 56. This is possible due to the use of the two crankshafts 54 and 56 and thus there is no stagger between the cylinder banks 42 and 43. This per its a lower overall length for the engine than other more conventional type of V-type engines.

The output shaft 24 is journaled on the longitudinal center line of the watercraft 11 between the crankshafts 54 and 56 and below them, as already noted. Roller type bearings 58 are provided in the crankcase assembly 38 for journalling the output shaft 24.

A pair of gears 59 and 61 are affixed to the rear ends of the crankshafts 54 and 56, respectively. The gears 59 and 61 have the same diameter. These gears mesh with a timing gear 62 that is affixed to the output shaft 24 so as to establish not only a drive to the output shaft 24 but a timing relationship between the crankshafts 54 and 56 so that they rotate at the same speeds. Also, due to the location of the shafts 54 and 56 they will rotate in the same direction.

In the illustrated embodiment, the ratio between the gears 59 and 61 and the timing gear 62 is one-to-one but, if desired, a gear reduction may be employed so that the output shaft 24 rotates at a slower speed than the crankshafts 54 and 56. Such an arrangement will permit a higher speed of the engine 23 without cavitation of the impeller 33 of the jet propulsion unit 29. The timing transmission between the crankshafts 54 and 56 comprised of the gears 59, 61 and 62 is enclosed by a cover plate 60 that is affixed to the respective end of the crankcase assembly 38.

Cylinder head assemblies 64 and 65 are affixed to the cylinder blocks 42 and 43, respectively, and form the combustion chambers for the engine along with the cylinder bores 45 and 46 and pistons 47 and 48. Spark plugs 66 are mounted in the cylinder heads 65 and are fired by an ignition system which includes a magneto generator assembly 67 which is mounted at the end of the crankcase 38 opposite to the timing gears 59, 61 and 62. This flywheel magneto 67 is contained within an extension 68 of the crankcase assembly 38. As a result of this arrangement, the engine is quite compact.

As is well known in two-cycle crankcase compression engines, the crankcase chamber in which the crankshafts 54 and 56 rotate is divided into a plurality of sections or portions each associated with a respective one of the cylinder bores 45 and 46. These portions are sealed from each other. This includes crankcase chambers 69 associated with the cylinder block 42 and crankcase chambers 71 associated with the cylinder block 43 and associated with its cylinder bores 46. An induction system, indicated generally by the reference numeral 72 is provided for delivering a fuel/air charge to the crankcase chamber 69 and 71. In accordance with a feature of the invention, the induction system 72 is disposed in substantial part in the valley 44 between the cylinder blocks 42 and 43. This provides a compact assembly and also permits the maintenance of a low overall height for the engine 23.

The induction system 72 is comprised of a pair of dual down draft carburetors 73 that are mounted on an intake manifold 74. Air is delivered to the down draft carburetors 73 from respective air inlet and silencer devices 75. Each barrel of each carburetor 73 serves one crankcase chamber 69 or 71 of the respective cylinder block 42 and 43. The intake manifold 74 has individual runners that cooperate with intake ports 76 and 77 divided by a dividing wall 78 of the upper crankcase member 41. Reed type check valves 79 and 81 are positioned in each of the intake ports 76 and 77 for permitting a charge to flow into the respective crankcase chambers 69 and 71 as the pistons 47 and 48 move upwardly and which preclude reverse flow as these pistons move downward.

Upon the downward movement of the pistons 47 and 48, the charge in the individual crankcase chambers 69 and 71 is compressed and then transferred to the combustion chambers above the pistons 47 and 48 through respective scavenge passages (not shown). This type of structure is well known in the art. The charge is then further compressed in each combustion chamber and is fired by the respective spark plug 66 therein in a timed relationship by the ignition system thus far described.

When the charge burns it expands and drives the pistons 47 and 48 downwardly and eventually opens exhaust ports 82 and 83 formed in the cylinder blocks 42 and 43 on the side thereof away from the valley 44. These exhaust gases are then delivered to respective exhaust manifolds 84 and 85 that are affixed to the outer sides of the cylinder blocks 42 and 43, respectively. As may be seen in FIGS. 1 and 2, these exhaust manifolds 84 and 85 extend along the sides of the engine 23 and thus maintain a compact arrangement.

Referring now again primarily to FIGS. 1 and 2, it will be noted that the central placement of the carburetors 73 positions them beneath the hatch cover 19 and accessible through the opening closed by the smaller cover 22. This permits servicing of both the carburetors 73 and also the spark plugs 66 through the smaller hatch cover 22.

The engine 23 is water cooled and water for its cooling is drawn from the body of water in which the watercraft 11 is operated in any well known manner. A suitable engine driven water pump may be provided for this purpose. The water is then circulated through cooling jackets in the cylinder blocks 42 and 43 and cylinder head assemblies 64 and 65. This water is then discharged into a cooling jacket which may encircle the exhaust manifolds 84 and 85 and around respective expansion chambers 86 and 87 that are disposed on opposite sides of the engine 23 and which extend along the cylinder blocks 42 and 43 and extend vertically upwardly above them to a small extent as best seen in FIG. 3. At some point this cooling water is then mixed with the exhaust gases so as to achieve silencing and cooling of the exhaust gases.

Each expansion chamber 86 and 87 communicates through a respective conduit 88 and 89 with forwardly position water trap devices 91 and 92 disposed on opposite sides of the watercraft at equal distances to the longitudinal center line thereof so as to maintain side-to-side balance. The water trap devices 91 and 92 may form one or more internal expansion chambers and baffling arrangements so that the water from the engine cooling system will not flow back through the exhaust system to the engine 23 but will be discharged to the atmosphere along with exhaust gases as now will be described.

Each water trap 91 and 92 discharges water though a respective exhaust pipe 93 and 94 that extend along the length of the watercraft and which pass above the respective cylinder head 64 and 65 so as to maintain a relatively compact construction and permit the free flow of the exhaust gasses. The exhaust pipes 93 and 94 terminate in oppositely facing discharge openings within the tunnel 31 as seen in FIG. 2. Hence, the exhaust gases will be discharged into the area of the tunnel and may be discharged below the body of water in which the watercraft is operating under some or all speeds for additional silencing. However, the water trap devices 91 and 92 will insure that none of this cooling water can flow back to the engine through the exhaust system, as already described.

A watercraft constructed in accordance with another embodiment of the invention is illustrated in FIGS. 5–9 and is indicated generally by the reference numeral 101. In many regards, the components of this embodiment are the same as those of the embodiment previously described, although the orientation may be slightly different. Where that is the case, the components are identified by the same reference numerals and will not be described again, except insofar as is necessary to understand the construction and operation of this embodiment as to describe the different orientation. In addition, certain of these components are illustrated in more detail in this embodiment and where that is the case, this more detailed construction will be described.

Figure 7:
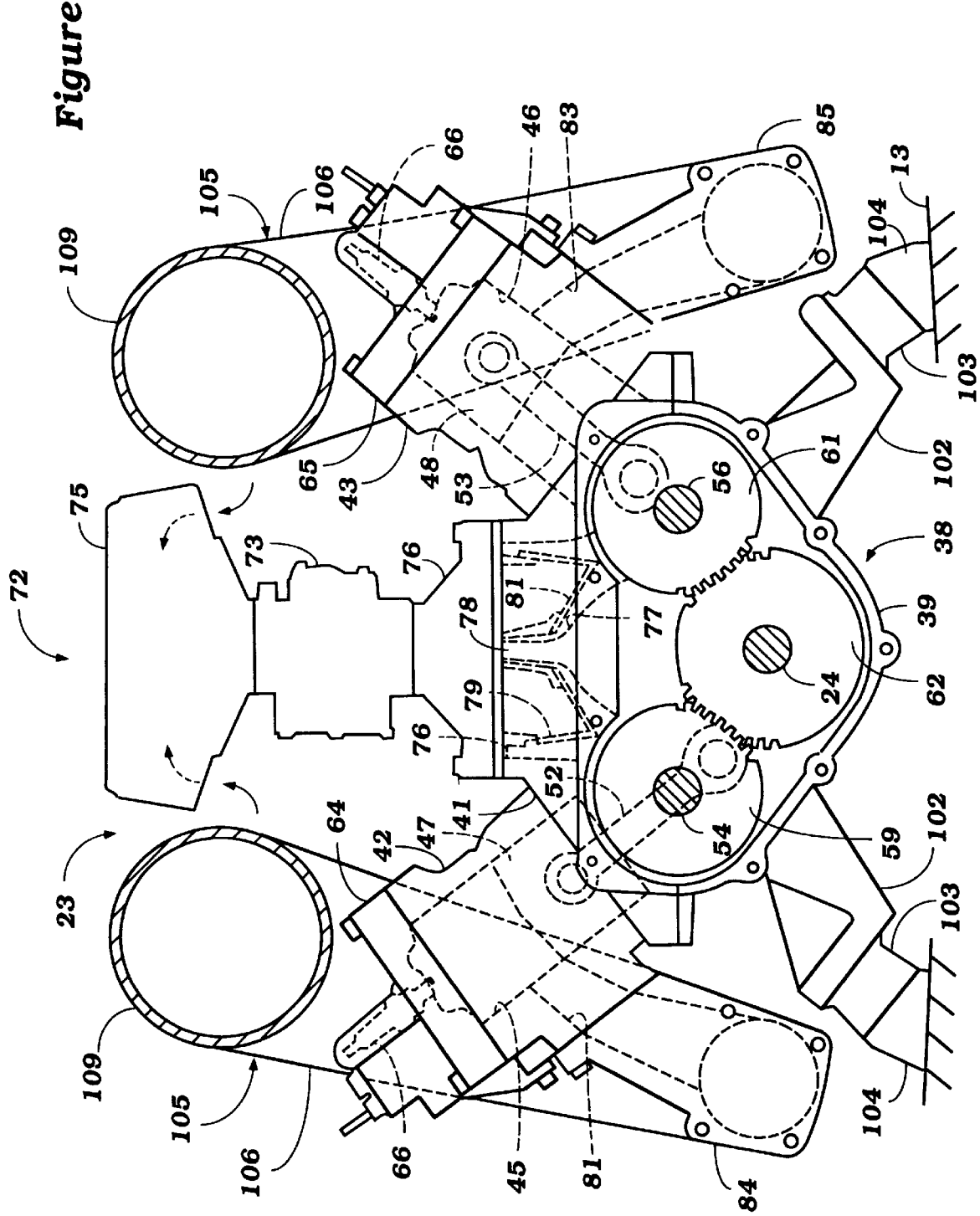
FIG. 7 is a view, in part similar to FIG. 3, and shows the engine of this embodiment, with portions broken away and shown in sections.
Figure 8:
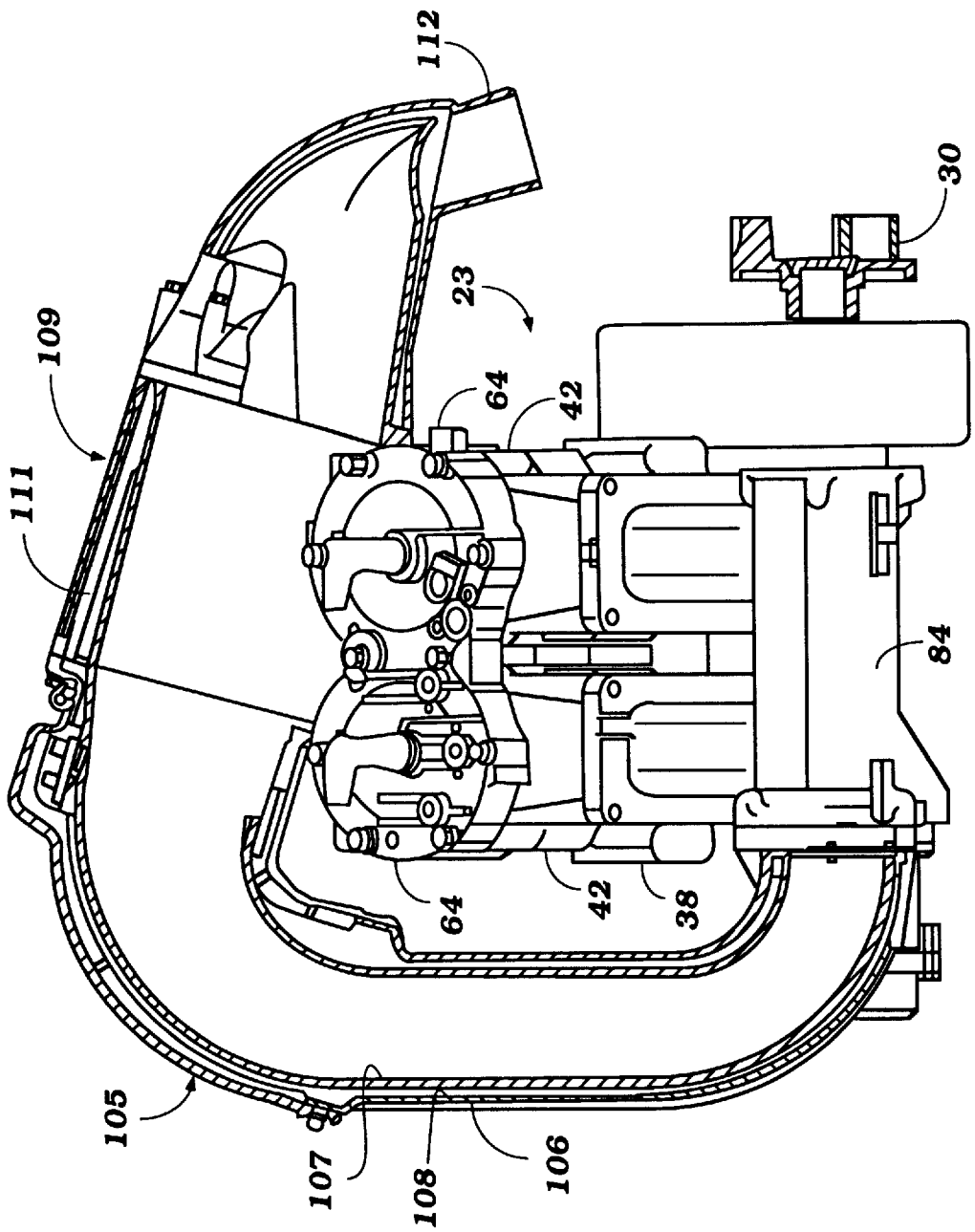
FIG. 8 is an enlarged side elevational view of the engine, with a portion of the exhaust system broken away and shown in sections.
Figure 9:
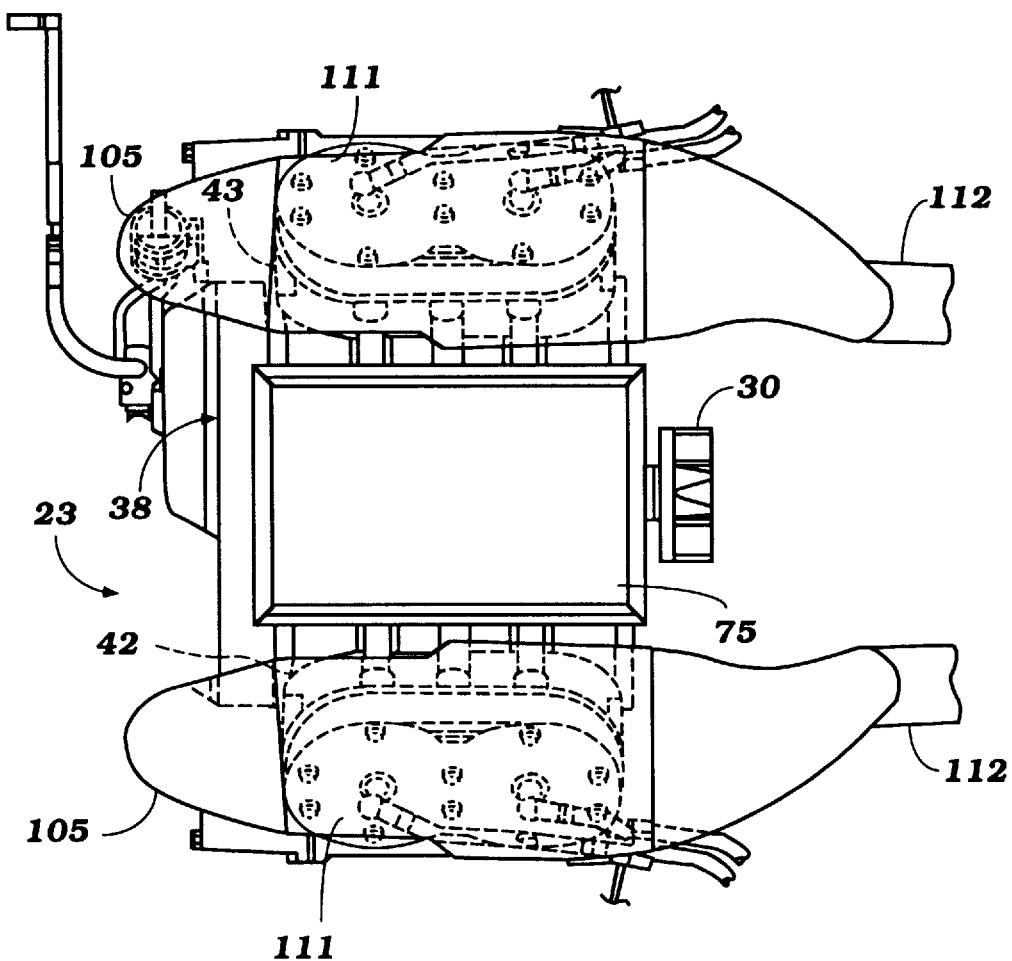
FIG. 9 is a top plane view of the engine of this embodiment.

In FIG. 7, the arrangement for mounting the engine 23 in the hull portion 13 is specifically illustrated. This includes a pair of engine mounts 102 that are affixed to the crankcase 38 and which cooperate with elastic isolators 103 and hull mount brackets 104 for mounting the engine 23 resiliently on the hull portion 13. The engine mount 102 and hull mounted brackets 103 are bonded to each other and to the elastic elements 103 in a manner well known in this art.

The layout of the exhaust system of the engine 23 in this embodiment is different from that previously described and for that reason the entire exhaust system will be described. This includes, like the embodiment of FIGS. 1–4, exhaust manifolds 84 and 85 that are affixed to the outboard sides of the cylinder blocks 42 and 43. Unlike the previously described embodiment wherein the expansion chamber devices are positioned also on the outboard side of the engine, in this embodiment, a connecting pipe, indicated by the reference numeral 105 is disposed at each side of the engine and communicates with a forwardly opening discharge port of the respective exhaust manifold 84 and 85. It will be seen that the connecting pipe 105 is of a double wall construction having an outer wall 106 that is spaced from the inner wall 107 and defines therebetween a water jacket 108 that receives coolant from the engine cooling jacket in any suitable manner. The connecting pipe 105 merges into an expansion chamber device 109 which is disposed above the cylinder head 64 and 65 of each of the cylinder banks 42 and 43. This expansion chamber device also has a double wall construction defining a cooling jacket 111 there around. The expansion chamber device 109 passes back over the top of the engine 23 and terminates in a discharge nipple 112 into which the water from the cooling jackets 108 and 111 is dumped for mixing with the exhaust gases.

The expansion chamber nipples 112 communicate with respective exhaust pipes 113 (FIG. 5 and 6) that extend along the sides of the hull outwardly of the tunnel 28 and which terminate in water trap devices 114, each disposed on opposite sides of the tunnel 28. The water trap devices 114 are, therefore, balanced side by side and thus the watercraft 101 is well balanced both in a fore and aft and in a side to side direction. The water trap devices 114 operate like those of the previously described embodiment so as to permit the discharge of water from the engine cooling jacket along with the exhaust gases while precluding any water from flowing into the engine through its exhaust system.

Each water trap device 114 discharges into a respective exhaust pipe 115 which, like the previously described embodiment, discharges into the tunnel 28 for a discharge of the exhaust gases to the atmosphere.

It should be readily apparent from the foregoing description that the described embodiments of the invention provide a very compact engine and watercraft and also an engine that incorporates a transmission so that the engine can operate at a greater speed than the jet propulsion unit which it drives and avoid the likelihood of cavitation. Of course, the foregoing description is that of preferred embodiments of the invention and various changes and modifications may be made without departing from the spirit and scope of the invention, as defined by the appended claims.

We claim:

1. A watercraft comprised of a hull defining an engine compartment, a two-cycle, crankcase compression internal combustion engine contained within said engine compartment and for a watercraft having a crankcase chamber journaling an output shaft, a pair of cylinder blocks extending at a V-angle to each other and affixed to said crankcase chamber, each cylinder block having at least one cylinder bore containing a piston for driving said output shaft, said cylinder bores having axes lying a plane that extends transversely to said output shaft, an induction system for said engine disposed substantially completely in a valley defined between said cylinder blocks for delivering at least an air charge to said crankcase chamber for transfer to combustion chambers formed above said pistons, and a pair of exhaust manifolds each affixed to a respective one of said cylinder blocks on the side thereof facing away from said valley.

2. A watercraft as in claim 1, further including an exhaust system for discharging exhaust gases from the exhaust manifolds to the atmosphere including portions extending over the engine.

3. A watercraft as in claim 2, wherein the exhaust system includes water trap means for precluding water from entering the engine through the exhaust system.

4. A watercraft as in claim 3, wherein the water trap means comprises a pair of water traps, each disposed in front of the respective cylinder block.

5. A watercraft as in claim 3, wherein the water trap means comprises a pair of water traps, each disposed to the rear of the engine on the side of the respective cylinder block.

6. A watercraft as in claim 1, further including a pair of expansion chambers, each communicating with a respective one of the exhaust manifolds.

7. A watercraft as in claim 6, wherein the expansion chambers are disposed on the same side of the cylinder blocks as the exhaust manifold.

8. A watercraft as in claim 7, further including an exhaust system for discharging exhaust gases from the expansion chambers to the atmosphere including portions extending over the engine.

9. A watercraft as in claim 6, wherein the expansion chambers are disposed above the respective cylinder banks.

10. A watercraft as in claim 9, further including a pair of water trap devices disposed to the rear of the engine and each communicating with a respective one of the expansion chambers.

11. A watercraft as in claim 10, wherein the exhaust manifolds have discharge ends disposed at the front of the engine and wherein the exhaust manifolds communicate with the expansion chambers by means of connecting pipes that extend substantially vertically upwardly at the front of the engine.

12. A watercraft as in claim 1, wherein each cylinder block has at least two longitudinally spaced cylinder bores and two pistons, each cylinder bore axis of one cylinder block being in a common transversely extending plane with a corresponding cylinder bore axis of the other cylinder block.

13. A watercraft as in claim 12, wherein the pistons of each cylinder block drive a respective crankshaft.

14. A watercraft as in claim 13, wherein the crankshafts drive the engine output shaft through a transmission.

15. A watercraft as in claim 14, wherein the transmission comprises first and second gears affixed respectively to the crankshafts and each enmeshed with a third gear affixed to the output shaft.

16. A watercraft as in claim 15, wherein the output shaft is connected to the propulsion device by means of a flexible coupling disposed to the rear of the transmission.

17. A watercraft as in claim 16, further including a magneto generator driven by one of the crankshafts at one end thereof.

18. A watercraft as in claim 17, wherein the magneto generator is driven at end of the engine opposite from the transmission.

19. A watercraft as in claim 1, wherein the propulsion unit is disposed to the rear of the engine.

20. A watercraft as in claim 19, wherein the propulsion unit comprises a jet pump.

21. A watercraft as in claim 20, wherein the hull has an opening disposed above the induction system and a removable hatch closing the opening.

22. A watercraft as in claim 21, wherein the removable hatch closes an opening formed in a further hatch pivotally connected to the deck and having a substantially larger opening.

23. A watercraft as in claim 22, wherein the first hatch is pivotally carried by the second hatch.

24. A watercraft comprised of a hull defining an engine compartment, a two-cycle, crankcase compression internal combustion engine contained within said engine compartment and having a crankcase chamber journaling an output shaft, a pair of cylinder blocks extending at a V-angle to each other and affixed to said crankcase chamber, each cylinder block having at least one cylinder bore and containing a piston for driving said output shaft, said cylinder bores having axes lying on a plane that extends transversely to said output shaft, an induction system for said engine disposed substantially completely in a valley defined between said cylinder blocks for delivering at least an air charge to said crankcase chamber for transfer to combustion chambers formed above said pistons, and a pair of exhaust manifolds each affixed to a respective one of said cylinder blocks on the side thereof facing away from said valley, a pair of expansion chambers each positioned on a respective side of said engine and receiving exhaust gases from the respective exhaust manifold, and an exhaust system for discharging the exhaust gasses from said expansion chambers to the atmosphere comprising an exhaust pipe extending from each of said expansion chambers across the top of the engine to the rear of said engine.

25. A two-cycle, crankcase compression internal combustion engine having a crankcase chamber journaling a pair of crankshafts, a pair of cylinder blocks extending a V-angle to each other and each affixed to said crankcase chamber, each cylinder block defining at least one cylinder bore containing one piston for driving the respective crankshaft, an output shaft journaled inside said crankcase between said crankshafts and at a level below the level of said crankshafts, first and second gears affixed respectively to said crankshafts and each enmeshed with a third gear affixed to said output shaft for driving said output shaft from said crankshafts, and a magneto generator driven by one of said crankshafts at one end thereof.

26. An engine as in claim 25, wherein the magneto generator is driven from the end of the engine opposite from the transmission.

* * * * *